(12) United States Patent
Monroe

(10) Patent No.: US 6,524,483 B1
(45) Date of Patent: Feb. 25, 2003

(54) METHOD OF RETROFITTING AN EXISTING RO SYSTEM TO ZERO WASTE

(75) Inventor: Jerry Monroe, Peoria, AZ (US)

(73) Assignee: Watts Regulator Co., North Andover, MA (US)

( * ) Notice: Subject to any disclaimer, the term of this patent is extended or adjusted under 35 U.S.C. 154(b) by 20 days.

(21) Appl. No.: 09/804,712

(22) Filed: Mar. 12, 2001

(51) Int. Cl.⁷ .............................................. B01D 61/10
(52) U.S. Cl. .................................. 210/652; 137/15.01
(58) Field of Search ................................ 210/652, 637, 210/805, 918; 137/15.01

(56) References Cited

U.S. PATENT DOCUMENTS

| | | |
|---|---|---|
| 3,207,282 A | 9/1965 | Norris |
| 3,550,782 A | 12/1970 | Veloz |
| 3,630,378 A | 12/1971 | Bauman |
| 3,726,793 A | 4/1973 | Bray |
| 3,746,640 A | 7/1973 | Bray |
| 3,786,924 A | 1/1974 | Huffman |
| 3,849,305 A | 11/1974 | Manjikian |
| 3,856,676 A | 12/1974 | Grimme, Jr. et al. |
| 4,156,621 A | 5/1979 | Andrews et al. |
| 4,160,727 A | 7/1979 | Harris, Jr. |
| 4,321,137 A | 3/1982 | Kohler |
| 4,332,685 A | 6/1982 | Nowlin et al. |
| 4,344,826 A | 8/1982 | Smith |
| 4,610,605 A | 9/1986 | Hartley |
| 4,626,346 A | 12/1986 | Hall |
| 4,670,144 A | 6/1987 | McCausland et al. |
| 4,702,842 A | 10/1987 | Lapierre |
| 4,801,375 A | 1/1989 | Padilla |
| 4,808,287 A | 2/1989 | Hark |
| 4,812,237 A | 3/1989 | Cawley et al. |
| 4,842,724 A | 6/1989 | Bray et al. |
| 5,006,234 A | 4/1991 | Menon et al. |
| 5,039,402 A | 8/1991 | Himelstein |
| 5,043,066 A | 8/1991 | Miller et al. |
| 5,064,097 A | 11/1991 | Brog et al. |
| 5,069,782 A | 12/1991 | Moyher, Jr. et al. |
| 5,089,144 A | 2/1992 | Ozkahyaoglu et al. |
| 5,112,477 A | 5/1992 | Hamlin |
| 5,122,265 A | 6/1992 | Mora et al. |
| 5,203,803 A | 4/1993 | Schoenmeyr |
| 5,256,279 A | 10/1993 | Voznick et al. |
| 5,282,972 A | 2/1994 | Hanna et al. |
| 5,445,729 A | 8/1995 | Monroe et al. |
| 5,484,538 A | 1/1996 | Woodward |
| 5,573,142 A | 11/1996 | Morellato et al. |
| 5,582,717 A | 12/1996 | Di Santo |
| 5,639,374 A | 6/1997 | Monroe et al. |
| 5,766,453 A | 6/1998 | Morellato et al. |
| 5,879,558 A | 3/1999 | Monroe et al. |
| 5,928,503 A | 7/1999 | Shang-Chun |
| 5,976,363 A | 11/1999 | Monroe et al. |
| 5,997,738 A | 12/1999 | Lin |
| 6,103,125 A | 8/2000 | Kuepper |
| 6,319,399 B1 * | 11/2001 | Peterson et al. |

* cited by examiner

Primary Examiner—Joseph W. Drodge
Assistant Examiner—Terry K. Cecil
(74) Attorney, Agent, or Firm—Fish & Richardson P.C.

(57) ABSTRACT

Diverse existing non-zero waste reverse osmosis systems are retrofittable by unskilled labor to become zero waste by a method using integrally-packaged subassemblies (1, 2, 3) placed in-line in the inlet to the RO unit and in each of the outlets from the RO unit. Using the subassemblies, the retrofit most typically requires only six connections thereby simplifying system installation, improving system reliability, and extending system longevity.

6 Claims, 9 Drawing Sheets

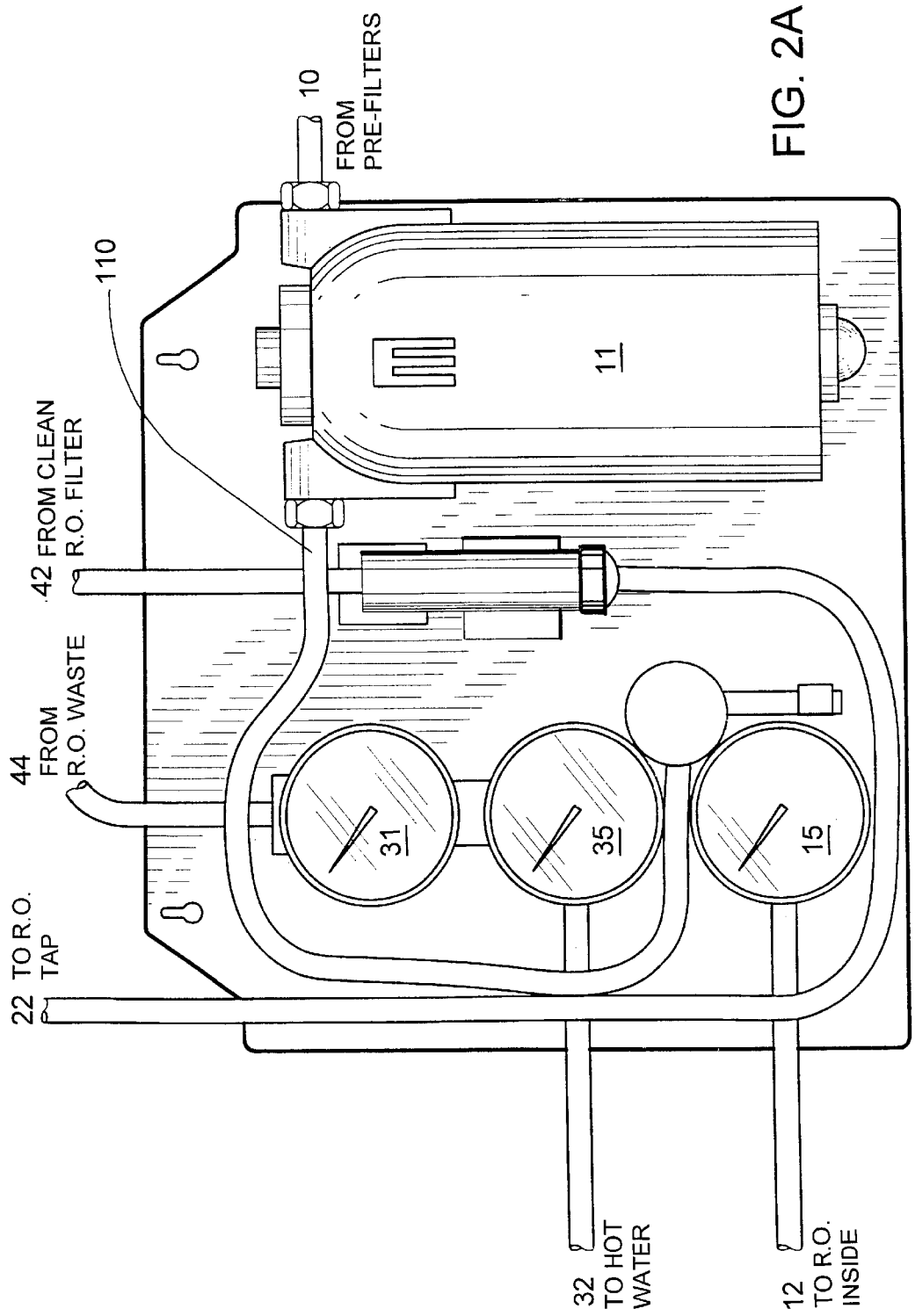

METHOD OF RETROFITTING AN EXISTING RO SYSTEM TO ZERO WASTE

BACKGROUND OF THE INVENTION

1. Field of the Invention

The present invention generally concerns reverse osmosis (RO) systems, and zero-waste RO systems.

The present invention particularly concerns (i) the retrofit of diverse existing non-zero-waste RO systems to become zero waste RO systems, (ii) the partitionment and packaging of the multiple components of RO systems particularly as are of the zero waste type, and (iii) the modular construction of zero-waste RO systems.

2. Description of the Prior Art

2.1 General Requirement to Abate Water Wastage Attendant Upon RO

Conventional systems for purifying water by process of reverse osmosis (RO) produce, in addition to purified water, a considerable amount of waste water. This waste water, which is a by-product of the RO process, is also called concentrate water or reject water. It is typically put down the drain of the residence or business in which the RO system is installed. Although called "waste", the waste water is in no way contaminated or unsafe. It simply contains a somewhat higher proportion of the elements—mostly minerals—removed from the supply water by the RO process than does the supply water itself. This additional concentration is, of course, resultant from the addition to the waste water of those elements that were previously present in the purified water.

This waste water is of increasing concern, particularly in increasing widespread areas of the world where water is scarce, and even a precious commodity. It is economically inefficient to pump water to distances ranging to thousands of miles, as in the American west, only to put it down the drain. For example, the ratio of concentrate or reject water to purified water can range from about 3:1 to about 15:1 depending on the particular system. This means that for every gallon of purified water produced, from 3 to 15 gallons is considered as concentrate water and is customarily sent to a drain.

It should be understood that recognition of, and concern over, this wastage is not limited to just the inventor of the present application (and a related patent), and to the inventors of still other related patents. Improvements in RO systems have already been made. RO systems sold in the United States up until about 1991 did not necessarily incorporate a shut-off switch—shutting off the flow of water when the tank reservoir of purified water became full, and preventing a RO system from constantly dripping water—until 1991 when the State of California mandated this wastage-abating feature for all RO systems sold within that state.

Legislatures in several states of the American West now seem poised to act again, and to mandate that newly sold and installed RO systems be of the new "zero waste" type. The Uniform Plumbing Code (UPC) of the International Association of Plumbing and Mechanical Officials (IAPMO) is presently (circa 2000) in process of being specifically revised so as to set standards for the plumbing of zero-waste RO systems. Unfortunately, such a legislative mandate and/or plumbing code revision will do nothing to abate the cumulative wastage of many millions of RO systems that are already installed. For example, an estimated 3 million RO systems are already installed in the State of California alone.

As fresh water resources become more remote and more costly, certain areas of the world, including areas in America, are very willing to consider further water conservation measures—especially as would have no discernable performance impact on the water consumer. Zero waste RO systems are such an improvement: the consumer sees no change in the quality of the purified water.

Accordingly, it would be useful if some way could be devised for efficiently and economically retrofitting existing non-zero-waste RO systems to become of the zero-waste type. Such retrofitting would seemingly best use the labor of the homeowner, or a commercial building maintainer, or an installation team of semi-skilled laborers so as to avoid the expense of a journeyman plumber. According to the use of unskilled or semi-skilled labor, the retrofit would desirably be very simple, easy and foolproof. According to (i) the diversity of deployed RO systems, and (ii) the difficulty in eliciting from the building owner any specific information by which any retrofitted items might be selected or customized to a particular pre-installed RO system or a particular building, it would be preferable if any parts used in the retrofit process were (i) universally, or nearly universally, common, with (ii) little wastage of any unused parts.

If the cost of the waste water from an RO system is—as is typical in the U.S. circa 2000—but some few dollars per month, while the cost of a retrofit kit, even as may be self-installed, is—as may be projected—some hundreds of dollars then the only owners of non-zero-waste RO systems who will be incentivized to retrofit to a zero waste type will likely be avid conservationists. However, a water district, or a municipality, can dictate retrofit of all non-zero-waste RO systems, provide a monetary incentive if desired. For example, a water district can simply (i) amortize the cost of an RO retrofit kit and its installation—which are both likely offered at no initial charge to district consumers—by amortizing the price therefore over a period of some years on a consumer's water bill, while (ii) penalizing with higher water rates those consumers who refuse to retrofit to, or install new, zero-waste RO systems.

In the case of consumers self-installing all new zero-waste RO systems, then these systems might typically be subject to cash rebates and other incentives (such as reduced water rates) by the water district; much as similar rebates are currently given in many U.S. water districts for the installation of low flush volume toilets.

However, merely offering a consumer either (i) a reduced rate or, more likely, (ii) the avoidance of a penalty rate, for water consumption if and when a consumer accepts and allegedly installs a zero-waste RO retrofit kit is not a complete solution. Some consumers may accept the kits to get the favorable rate, or avoid the penalty rate, but languish in performing the actual installation. And it is difficult for the water district to confirm installation, by monitoring water consumption or otherwise. It would therefore be useful if this entire retrofit process was well thought through prior to beginning a water-district-wide retrofit effort. It will be seen that the present invention accords for the return of a small and simple, but indispensable, used part from any non-zero-waste RO system to the water district to confirm either (i) retrofit to a zero-waste system, or (ii) dismantlement of the existing non-zero-waste system (whether attendant upon installation of a new zero-waste system or not) The part is normally readily easily unambiguously detectable as used, and it is not realistically feasible for the building owner to buy the (used) part in a hardware store and send to his or her water district as (fraudulent) "proof" of compliance.

2.2 Specific Previous Zero Waste RO Systems

The present invention will be seen to be primarily concerned with the physical partitionment, and packaging, of reverse osmosis (RO) systems, particularly of the zero-waste type. Being so focused, the present invention is not primarily directed to the flow paths and apparatus used to realize a zero-waste reverse osmosis system—of which there are several variant types—per se. Since it is useful to understand the principles of a zero waste RO system, and of the several variants of such systems, in assessing the structure and function of highly-integrated and compactly-packaged zero-waste RO systems in accordance with the present invention, the reader may care to make reference to the prior art in order to specifically understand zero waste RO systems.

Among this prior art, U.S. Pat. No. 4,626,346 to Hall discloses a reverse osmosis water purification system useful in limited water supply installations such as are found in recreational vehicles, boats and the like which use an unpressurized supply tank for the water source. According to the Hall patent, waste water from the reverse osmosis unit is recycled back to the supply tank to conserve water.

U.S. Pat. No. 5,639,374 for a WATER-CONSERVING PRESSURE-MAINTAINING REVERSE OSMOSIS SYSTEM to inventors including the selfsame Monroe who is the inventor of the present invention concerns a reverse osmosis water purification system in which the concentrate water normally produced by the process is not disposed of by routing it to a drain line or otherwise, but is redirected to the main water supply. The system includes the well-known components of a reverse osmosis membrane, pre-filters which are installed ahead of the reverse osmosis membrane, and an appropriate tank to store the purified water. In addition, the system includes a pump and associated pressure sensing device for increasing the pressure of the incoming non-processed water to the reverse osmosis unit, and a pipe to carry the concentrate water from the reverse osmosis unit to the incoming main water supply, be it either a cold or hot water line. Additionally included is a one-way check valve in the concentrate water line, and a sensing device in the purified water storage tank to turn the pump off whenever the quantity of water in the tank exceeds a predetermined amount.

Notably in construction of the Monroe, et al. system, and as an important feature carried over into the preferred embodiments of systems in accordance with the present invention, a flow connection between the (i) waste outlet port of a RO unit, and (ii) a pressurized water source, is both unconstricted and unrestricted. By this unconstricted and unrestricted connection the waste, or concentrate, water from the RO unit encounters during its entire conveyance the full and exact pressure of the supply water. Being that there is no pressure differential, nor any (pressure-differential-inducing) obstruction, within the flow conduit, there is no build-up of contamination in the flow path—which is operationally important.

U.S. Pat. No. 5,879,558 to Monroe, et al., for a WATER CONSERVING REVERSE OSMOSIS UNIT AND METHOD OF OPERATING IT likewise discloses a reverse osmosis water purification system in which the concentrate water which is normally produced by the process is not disposed of by routing it to a drain line or otherwise, but is instead redirected to the main water supply. The system includes the well-known components of a reverse osmosis membrane, pre-filters which are installed ahead of the reverse osmosis membrane, and an appropriate tank to store the purified water. In addition, the system includes a pump and associated pressure sensor for increasing the pressure of the incoming non-processed water to the reverse osmosis unit, means for directing the concentrate water from the reverse osmosis unit to the incoming main water supply (cold), or to a hot water line. Additionally included is a one-way check valve in the concentrate water line, and a sensor sensing the pressure of water in the storage tank and turn the pump off whenever the pressure exceeds a predetermined value.

As with the '374 patent, a concentrate water pipe conveys concentrate water from a reverse osmosis unit to a downstream location of a water source that is essentially at the supply pressure. Although this concentrate water pipe includes a check valve for preventing water from the water source to flowing into the reverse osmosis unit (at the wrong point—the concentrate water output) such as under transient pressure surges, this pipe is again without any substantial pressure drop or flow restriction whatsoever. Namely, the check valve neither produces any substantial flow restriction nor any substantial pressure drop to the normal, outward, flow of concentrate water.

2.3 Integrated Packaging of Multiple Components of RO Systems

The present invention will be seen to be concerned with the partitionment, and packaging, of the multiple components of a reverse osmosis system (preferably of the zero-waste type), particularly such partitionment and packaging as provides a higher degree of integration than heretofore, simplifying both installation, and/or retrofit, of an RO system so greatly that these tasks may be reliably performed by amateurs.

A step towards the integration of several components of a RO system into a single unit is shown in U.S. Pat. No. RE 35,252 to Clack, et al., for a FLUID FLOW CONTROL DEVICE FOR WATER TREATMENT SYSTEMS. The Clack, et al., patent shows new and improved filtration purification or water treatment systems for providing improved purified drinking water at a point of use which systems are provided with a substantially leak-free fluid flow control device to which the other filtration purification system elements may be mated and engaged. Other system elements may include various filters or filter modules, as well as system leads for conveying (i) incoming tap water in, (ii) outgoing waste water out to drain and (iii) purified water from the filter section to a storage tank until desired for use. The fluid flow control device is preferably a unitary thermoplastic body formed from a pair of interconnecting halves, the body having (i) a number of discrete fluid flow passages extending therein, and (ii) mating grooves by which the halves are joined. In a preferred embodiment, the fluid flow control device includes each of (i) integrally formed input/output connector features, (ii) filter-receiving socket portions and (iii) an automatic shut off valve disposed in fluid flow communication with certain ones of the passages.

SUMMARY OF THE INVENTION

The present invention contemplates (i) retrofitting diverse existing non-zero-waste RO systems to become zero waste RO systems, (ii) packaging the multiple components of an RO system, and more particularly a zero waste RO system, within but a few separate assemblies, and (iii) constructing RO systems, particularly of the zero-waste type, within but a few modules, and at a high degree of integration.

The present invention particularly contemplates (i) a kit and (ii) a method for retrofitting existing reverse osmosis (RO) systems of the non-zero-waste type to become of the zero-waste type, and (iii) new-construction zero-waste RO systems distinguished in that much larger numbers of components than heretofore are integrally packaged. Indeed, some three (3) major flow paths—collectively flow-connecting to, most typically, some eight (8) or more associated components within a zero-waste RO system—are each preferably integrally packaged as a sub-assembly, and the three (3) sub-assemblies are preferably mounted to a plate to form one (1) single, integrated, assembly.

The entire present invention is thus more concerned with the physical partition and physical packaging of (zero waste) RO systems than with the theory and the plumbing flow paths of these systems. This means that (i) the plumbed pathways of zero-waste RO systems realized by application of the present invention are not represented to be unique, and (ii) the present invention is not concerned with new methods, or new flow paths, for the conduct of zero-waste RO. Instead, the partitionment and packaging concerns of the present invention are directed to (i) efficiently, economically and reliably retrofitting diverse pre-existing non-zero-waste RO systems to become zero-waste RO systems by but modest use of unskilled or semi-skilled labor, and (ii) constructing new RO systems—particularly of the zero-waste type—with an unparalleled high degree of components integration so as to better support improved economies-of-installation, system reliability, and system longevity.

A new-form, highly-integrated, (zero-waste type) RO system in accordance with the present invention is visually distinguishable from prior systems in that, inter alia, (i) the number of different assemblies or sub-assemblies in the system is greatly reduced, typically from as many as ten or more (i.e., 10+) to only three (3) or four (4). In simplest terms, system fluid flow paths that used to be plumbed externally between flow-connected system components are brought into the interiors of monolithic subassemblies, and functional components of the (zero-waste type) RO system are threadingly connected through fittings more than being plumbed.

Meanwhile, simultaneously, (ii) all system operator controls and indicators are ergonomically located in an orderly and accessible fashion. For example, some three (3) pressure gauges typically within a preferred zero-waste RO system in accordance with the present invention are all located neatly in a line, and are oriented so that the nominal correct pressure reading on each gauge produces an equal angular displacement of that gauge's pointer indicator against a green-red (good-bad) scale. Accordingly, the correct operation of the system is discernable at a glance. All owner/user manipulatable valves and the like, and all system components, are similarly clearly and logically situated and marked, removing much of the mystery as to what is what and, more importantly, permitting troubleshooting and repair directions to be given to amateurs, as in "twist the red valve clockwise in the direction of the red arrow".

The high degree of system integration supports, among other things, that diverse existing non-zero-waste RO systems may typically be converted to zero-waste RO systems simply by disconnecting three (3) existing plumbing unions (which are normally of a quite standard nature), and re-connecting each of the six (6) ends so created (as may be extended by use of simple extensions, and/or adapted by simple adapter fittings, as is infrequently necessary) to, most typically, three new monolithic sub-assembles that are themselves mounted to a single new frame or back plane, forming thereby an assembly that most typically flow-connects, most typically, some eight or more (8+) different components.

After (i) flow connections are realized by the simple turning of fittings, (ii) the major assembly, which contains an electric pump, is plugged to power, and (iii) a system water supply is turned back on, the entire job of retrofitting a zero-waste RO system is finished. Such simplicity of installation is not typical of previous RO systems of any type, and the inventive concept of retrofitting existing non-zero-waste RO systems to make them become zero-waste is not known by the inventor to have previously existed.

1. A Kit for Use in Retrofitting a Pre-existing Non-zero-waste Reverse Osmosis System In one of its aspects the present invention is embodied in one or more (first-level, or sub-) assemblies packaged as a kit for use in retrofitting a pre-existing non-zero-waste reverse osmosis system to become zero-waste.

The RO system to be retrofitted has at least a reverse osmosis membrane vessel and a purified water storage tank. In this RO system, water from a source of water is converted into purified water at a first outlet port, and waste water is produced at a second outlet port, of the reverse osmosis membrane vessel.

In this environment a kit in accordance with the present invention consists of one or more first-level assemblies, or sub-assemblies, including an integrally-packaged first sub-assembly having an inlet port that is flow-connected to a pump that is flow-connected to a solenoid valve that is flow-connected to a pressure gauge that is flow-connected to an outlet port. This integrally-packaged first sub-assembly is installed in-line a flow of supply water, with its inlet port flow-connected to the source of water, and with its outlet port flow-connected to an inlet port of the reverse osmosis membrane vessel.

The kit of one or more sub-assemblies may, and preferably does, further include an integrally-packaged second sub-assembly having an inlet port that is flow-connected to a check valve that is flow-connected to a tank shut-off valve that is flow-connected to an outlet port. This integrally-packaged second sub-assembly is installed in-line a flow of purified water, with its inlet port flow-connected to the first outlet port of the reverse osmosis membrane vessel, and with its outlet port flow-connected to the purified water tank.

The kit of one or more sub-assemblies may, and preferably does, still further include an integrally-packaged third sub-assembly having an inlet port that is flow-connected to a pressure gauge that is flow-connected to a dual check valve that is flow-connected to another pressure gauge that is flow-connected to an outlet port. This integrally-packaged third sub-assembly is installed in-line a flow of waste water, with its inlet port flow-connected to the second outlet port of the reverse osmosis membrane vessel, and with its outlet port flow-connected to the source of water.

Any, and preferably all, of the integrally-packaged first sub-assembly, second sub-assembly, and third sub-assembly are themselves integrally (i) flow-connected (via intervening components) and (ii) physically mounted together as one single monolithic assembly. The retrofit kit of the present invention therefore preferably consists of but one single assembly consisting of three sub-assemblies, plus associated minor universal plumbing connection and wall mounting hardware—which is clearly a good start towards simplifying installation. The retrofit kit connects to, and uses, components of the existing non-zero-waste RO system, most notably (i) any filters or pre-filters, (ii) the reverse osmosis membrane vessel, and (iii) the purified water storage tank.

2. A Method of Retrofitting a Pre-existing Reverse Osmosis System

In another of its aspects the present invention is embodied in a method of retrofitting a pre-existing reverse osmosis system (most normally of the non-zero-waste type) where the retrofit serves to make the RO system become zero waste.

The RO system subject to retrofit has at least a reverse osmosis membrane vessel and a purified water storage tank. In this RO system water from a source of water is converted into (i) purified water at a first outlet port, and (ii) waste water at a second outlet port, of the reverse osmosis membrane vessel.

In this environment the retrofit method consists of (ii) first-disconnecting a flow of water from the source of water from any flow-connection to an inlet port of the reverse osmosis membrane vessel, and then (ii) first-inserting in-line the disconnected flow of water an integrally-packaged first first-level assembly which has an inlet port flow-connected to a pump that is flow-connected to a solenoid valve that is flow-connected to a pressure gauge that is flow-connected to an outlet port. This first-inserting is so that inlet port becomes flow-connected to the source of water, and so that the outlet port becomes flow-connected to an inlet port of the reverse osmosis membrane vessel.

The retrofitting method preferably further consists of (i) second-disconnecting a flow of purified water from the first outlet port of the reverse osmosis membrane vessel from any flow-connection to the purified water tank, and then (ii) second-inserting in-line the disconnected flow of water an integrally-packaged second first-level assembly which has an inlet port that is flow-connected to a check valve that is flow-connected to a tank shut-off valve that is flow-connected to an outlet port. This second-inserting is so that the inlet port becomes flow-connected to the first outlet port of the reverse osmosis membrane vessel, and so that the outlet port becomes flow-connected to the purified water tank.

The retrofitting method preferably still further consists of (i) third-disconnecting a flow of waste water from the second outlet port of the reverse osmosis membrane vessel, and then (ii) third-inserting in-line the disconnected flow of waste water an integrally-packaged third first-level assembly which has an inlet port flow-connected to a pressure gauge flow-connected to a dual check valve flow-connected to a pressure gauge flow-connected to an outlet port. This third-inserting is so that the inlet port becomes flow-connected to the second outlet port of the reverse osmosis membrane vessel, and so that the outlet port becomes flow-connected to the source of water.

Between the third-disconnecting and the third-inserting any flow obstruction present in the flow of waste water from the second outlet port of the reverse osmosis membrane vessel is removed (in accordance with the teaching of U.S. Pat. Nos. 5,639,374 and 5,879,558 that such a flow obstruction is unsuitable for a zero-waste RO system). This removed flow obstruction, normally a simple washer, may be transmitted remotely from a site of the retrofitting as physical proof of having conducting the retrofitting. Specifically, it may be sent by post (usually in a provided postage-paid envelope of suitable size and form) to a water district headquarters to qualify for (i) a rebate and/or (ii) a reduction in the water rate charged the owner/user at the site at which the zero-waste RO system is newly installed.

In accordance with the preferred method, each of the first-inserting, the second-inserting and the third-inserting are done in a single session and at the same time. This is because the integrally-packaged first, second and third first-level assemblies are preferably themselves all (i) flow-connected and (ii) physically mounted together as one single assembly, and all the first-level assembles are accordingly most conveniently and easily inserted all together, and at the same time.

3. Three Sub-assemblies, and an Assembly, Used in the Conversion of an Existing Non-zero-waste Reverse Osmosis System to a Zero-waste Reverse Osmosis System In yet another of its aspects the present invention is embodied in an assembly used in the conversion of an existing nonzero-waste reverse osmosis system to a zero-waste reverse osmosis system.

The assembly includes (i) a first sub-assembly itself including a pump that is flow-connected to a solenoid valve that is itself flow-connected to a first pressure gauge, (ii) a second sub-assembly that itself flow-connects a check valve that is flow-connected to a tank shut-off valve, and (iii) a third sub-assembly that itself flow-connects a third pressure gauge that is flow connected to a double check valve that is flow connected to a fourth pressure gauge. Notably, the first sub-assembly and the second sub-assembly and the third sub-assembly are commonly both (i) flow connected (via intervening components) and (ii) physically mounted together, as one single assembly.

Any of the first, the second, and the third sub-assemblies taken individually, and in any combination(s), are likewise expressions of the present invention.

4. Improvement to a Zero-waste Reverse Osmosis System

In yet another of its aspects the present invention does not concern the retrofit of existing RO systems to become zero-waste, but rather with the construction zero-waste RO systems, and the zero-waste RO systems so constructed.

In accordance with this aspect, the present invention may be conceived as an improvement to existing zero-waste reverse osmosis systems having, by way of example, (i) first components including (again by way of example) a pump flow-connected to a solenoid valve that is flow-connected to a first pressure gauge all in a first flow path, (ii) second components including (again by way of example) a check valve that is flow-connected to a tank shut-off valve all in a second flow path, and (iii) a third flow path from a reverse osmosis membrane unit to a drain.

The improvement in accordance with the present invention is simply that at least one, and preferably two, and still more preferably all three of the first-flow-path first-components, the second-flow-path second-components, and new components inserted into the third-flow-path are each packaged together in a respective one of three sub-assemblies, and these three sub-assembles are themselves preferably mounted together as an assembly. Note that the most preferred integral package contains some three separate and different flow paths (each with its own associated components), and supports six connections (as connect to each end of the up-to-three flow paths).

Clearly the fact that different RO flow paths, and functions, are performed, and simultaneously performed, does not, in accordance with the present invention, prevent these paths and functions from being realized within a single unit.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2a is a pictorial view of a major assembly of the preferred retrofit zero-waste reverse osmosis system of the present invention, previously seen in FIG. 1, with (i) plumbed connections to the assembly being shown, and with (ii) certain assembly fluid flow paths being indicated in phantom line.

FIG. 2b is a diagrammatic perspective view of the same major assembly of the preferred retrofit zero-waste reverse osmosis system of the present invention, previously seen in FIG. 2a.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

In the system of numbering used in this specification odd numbers refer to physical objects which are most commonly the component, sub-assemblies and assemblies of reverse osmosis systems. Even numbers refer to ports, channels, conduits and like concepts which—although indisputably physically realized by plumbing connectors and piping and the like—are useful in referring to intangibles such as flow paths, points of plumbed connection, and the like.

Figure 1:
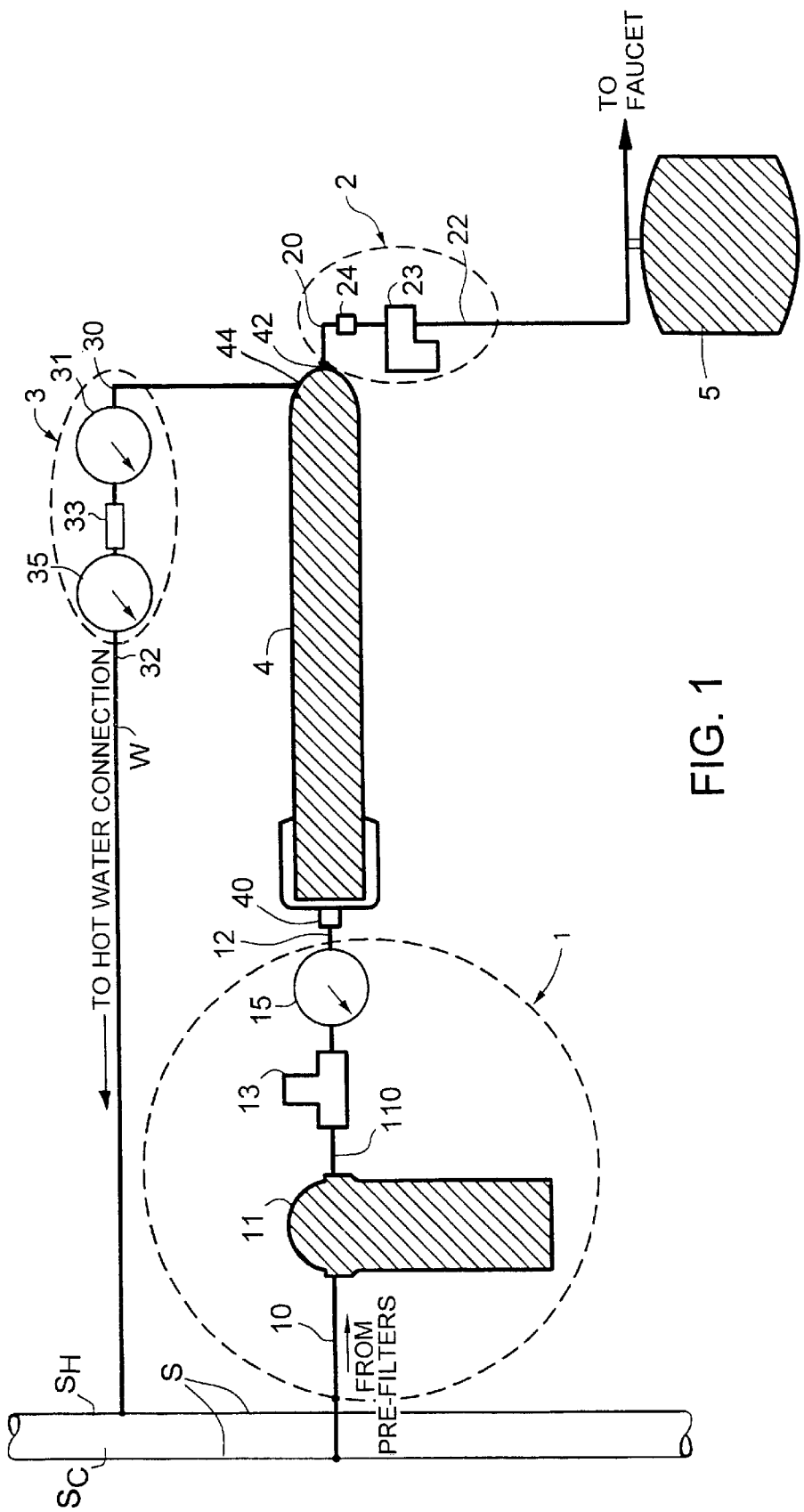
FIG. 1 is an iconic representation, and flow schematic, of a preferred embodiment of a reverse osmosis system retrofitted to become zero-waste, and packaged, in accordance with the present invention.
Figure 3:
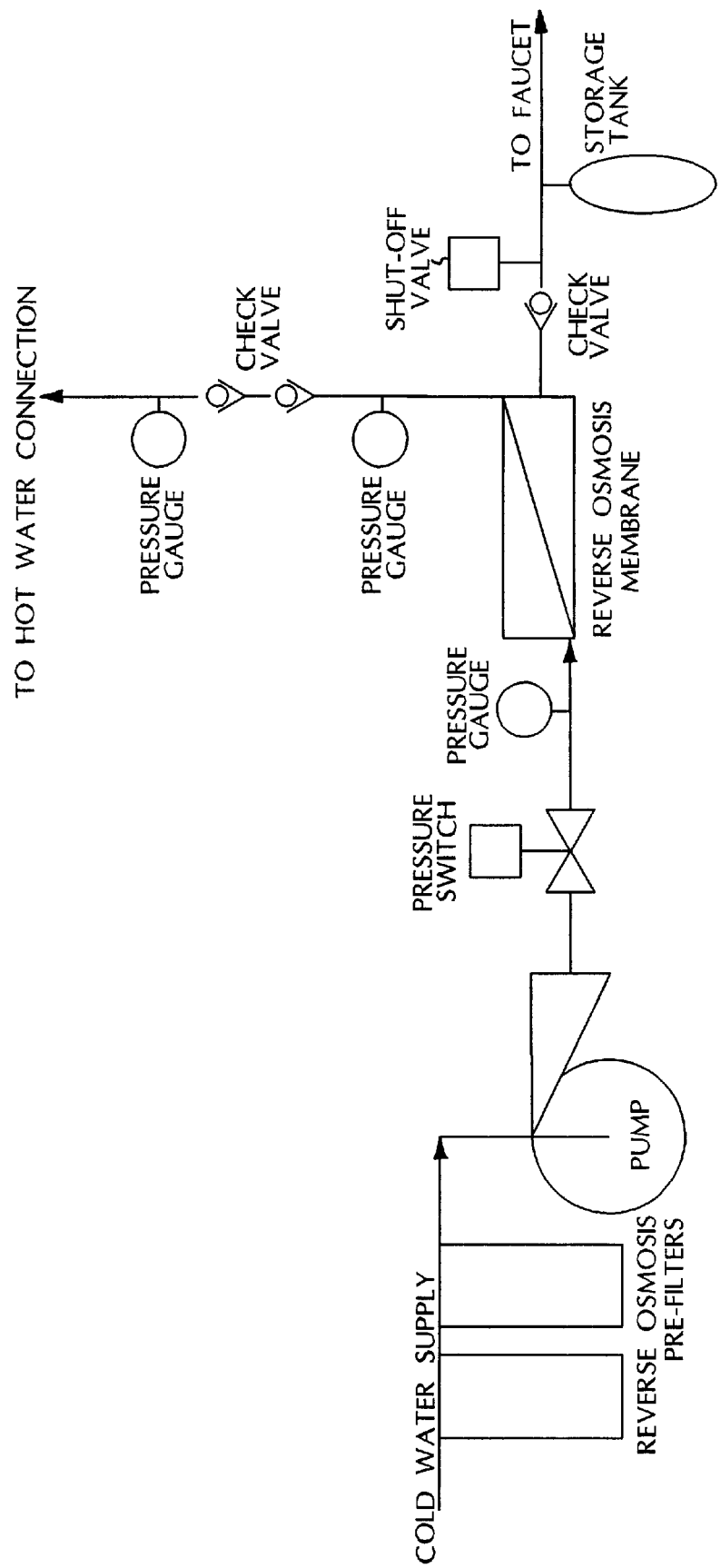
FIG. 3 is a flow schematic diagram of a first preferred embodiment of a zero-waste reverse osmosis system in accordance with the present invention.

An iconic representation of a preferred embodiment of a reverse osmosis system—retrofitted to become zero-waste—in accordance with the present invention is shown in FIG. 1. Fluid flow within the RO system, as is more particularly shown in the schematic of FIG. 3, is in substantial accordance with the teaching of U.S. Pat. No. 5,639,374 to Monroe, et al. for a WATER-CONSERVING PRESSURE-MAINTAINING REVERSE OSMOSIS SYSTEM.

In the retrofitted zero-waste reverse osmosis system of FIG. 1 only (i) filters and pre-filters, if any be present, (ii) a reverse osmosis membrane vessel 4 (with an internal membrane), and (iii) a purified water storage tank 5 remain from a previous nonzero-waste RO system. (Still further additional components, such as water supply valves, not relevant to the present analysis, may also remain: see FIGS. 3 and 4.) The connections to a water source S—most commonly to a cold water source $S_c$—and to a faucet F where purified RO water is output, existed in the previous RO system. The waste water outlet port 44 of the reverse osmosis membrane vessel 4 was connected to a drain (not shown). In accordance with the established principles and construction of zero-waste RO systems, this waste water will be returned to waters supply S, most commonly to the hot water supply $S_H$ as illustrated.

Accordingly, the first-level assemblies, or sub-assemblies, 1, 2, 3 are added during the retrofit process, and it is the partitionment, placement, nature, construction and connection of these sub-assemblies 1, 2, 3 that constitutes one principal aspect of the present invention.

All sub-assemblies 1, 2, 3 are integrally-packaged, meaning that all components (hereinafter described) within each such subassembly 1, 2, 3 come pre-packaged together, and are not intended to ever be separated. Additionally, the sub-assemblies 1, 2, 3 themselves are preferably packaged together—integrally, if this term is not held to be identical to monolithic—upon a common frame, or substrate, 45—as is most clearly seen in FIG. 2b.

Returning to FIG. 1, the sub-assembly 1 has an inlet port 10 flow-connected to a pump 11 flow-connected to a solenoid valve 13 flow-connected to a pressure gauge 15 flow-connected to an outlet port 12. It is clearly installed in-line the flow of water from the source or water S, with the inlet port 10 being flow-connected to this source of water S. The outlet port 12 is flow-connected to an inlet port 40 of the reverse osmosis membrane vessel 4, as illustrated.

The sub-assembly 2 has its inlet port 20 flow-connected to a check valve 24 which is flow-connected to a tank shut-off valve 23 which is flow-connected to an outlet port 22. This sub-assembly 2 is clearly installed in-line the flow of purified water from the reverse osmosis membrane vessel 4. Namely, the inlet port 20 of assembly 2 is flow-connected to the first outlet port 42 of the reverse osmosis membrane vessel 4. The outlet port 22 of sub-assembly is flow-connected to the purified water tank 5.

The third sub-assembly 3 has an inlet port 30 which is flow-connected to a pressure gauge 31 which is flow-connected to a dual check valve 33 which is flow-connected to a pressure gauge 35 which is flow-connected to an outlet port 32. This third sub-assembly 3 is installed in-line the flow of waste water from the reverse osmosis membrane vessel 4. Namely, the inlet port 30 of the third assembly 3 is flow-connected to the second outlet port 44 of the reverse osmosis membrane vessel 4. The outlet port 32 of the third assembly 3 is flow-connected to the source of water S, and preferably and more particularly to a source of not water $S_H$.

Figure 2B:
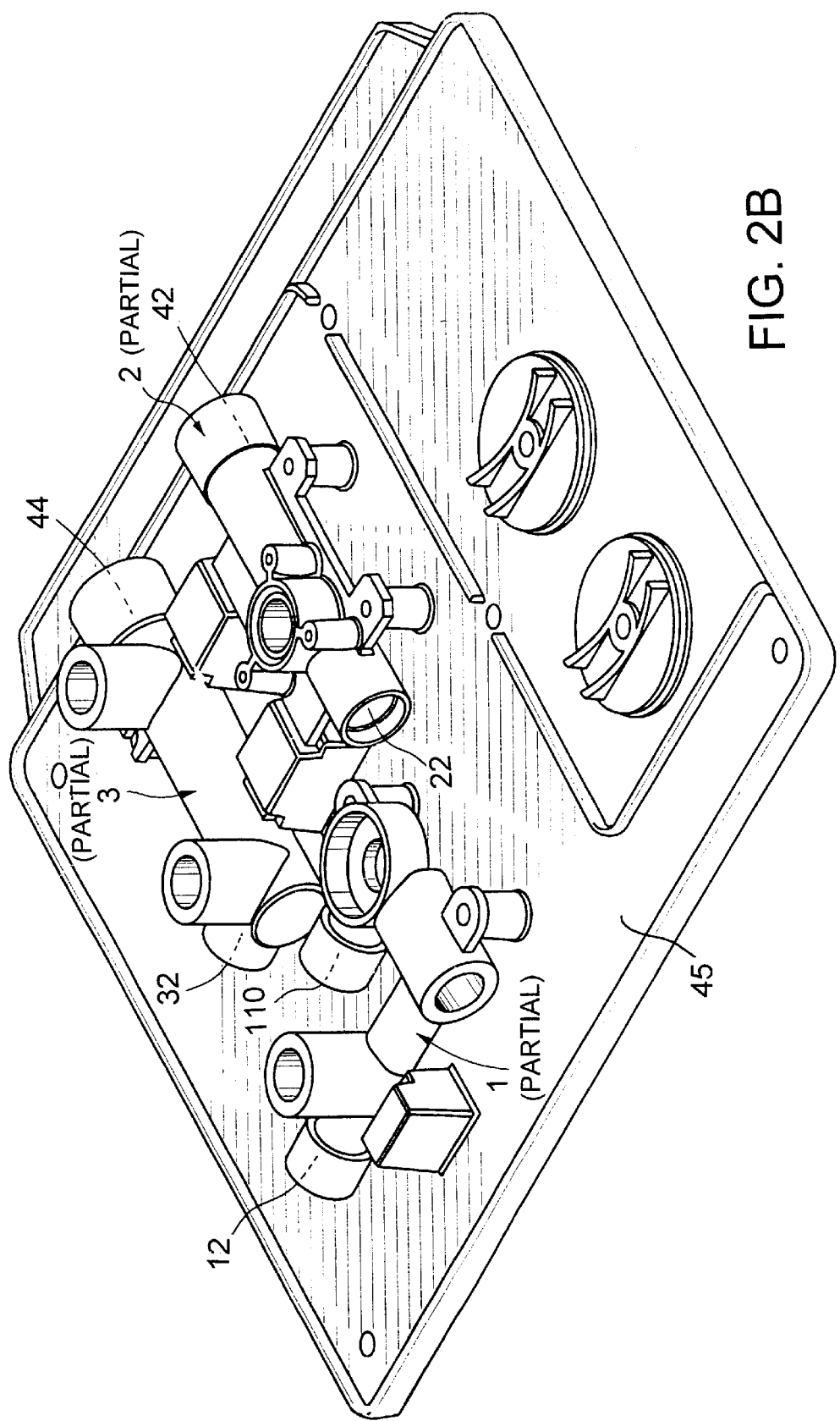

The sub-assemblies 1, 2, 3 are packaged as a kit. In accordance with the present invention any two, and preferably all three, of the assemblies 1, 2, 3 are physically mounted to the same frame, or substrate, or back plane, 45 as is most particularly illustrated in FIG. 2. The sub-assembles are thus presented as but a single unit. A pictorial illustration of such a preferred packaging, and single unit, is shown in FIG. 2, consisting of FIGS. 2a and 2b. The major sub-assemblies 1, 2, 3 are all packaged together in a single unit as shown. Some six (6) plumbed connections 10, 12; 20, 22; and 30, 32 all previously seen in FIG. 1 are again marked on FIG. 2, and are most clearly visible in FIG. 2b. Fluid flow paths within the individual sub-assemblies 1, 2 and 3 are indicated in phantom line. Likewise, selected visible components of the zero-waste RO system 1 are numbered identically in FIG. 2 as in the flow schematic of FIG. 9.

Clearly the integrally packaged sub-assemblies 1, 2 and 3 have some six (6) plumbed connections: 10, 110/12, 44, 32, 42 and 22. There is one only, low-voltage, electrical connection per the electrical schematic of FIG. 8. A.C. power 91 is converted to low voltage, nominally 24 v.a.c., in transformer 93, and used to supply, in electrical series, both the coil of the solenoid 95 of the tank shut-off valve 23 (shown in FIG. 1) and the pump motor 11 (shown in FIGS. 1 and 8). The 24 v.a.c., power is gated to both the coil of the solenoid 95 of the tank shut-off valve 23 and the motor 11 by tank pressure switch 97. Both (i) fluid and (ii) electrical connections are therefore limited, and straightforward.

In accordance with the present invention, the diversity of functions performed within the monolithic assembly—which functions may be understood by reference to the aforementioned U.S. Pat. No. 5,639,374—clearly does not necessitate that the multiple components performing these functions cannot be integrally housed in but a single unit. In actual fact, some three (3) different flow paths, and a nominal eight (8) different components of a zero-waste RO system are tightly integrated and packaged in, and by, the preferred retrofit kit of FIGS. 1 and 2.

Figure 4:
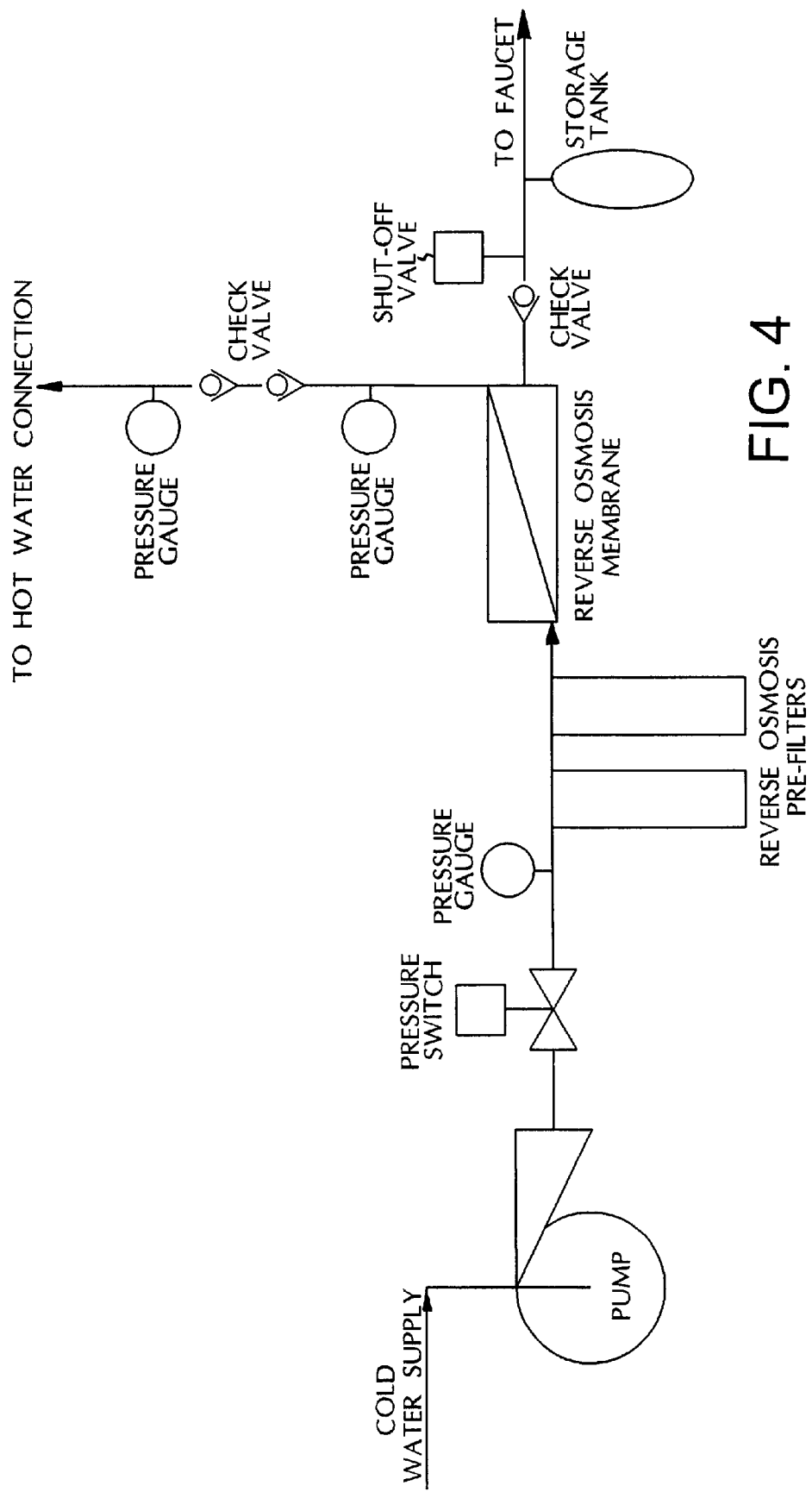
FIG. 4 is a flow schematic diagram of a second preferred embodiment of a zero-waste reverse osmosis system in accordance with the present invention.

A schematic diagram of a first preferred embodiment of a zero-waste reverse osmosis system in accordance with the present invention is shown in FIG. 3, and a like schematic diagram for a second preferred embodiment is shown in FIG. 4.

Figure 5:
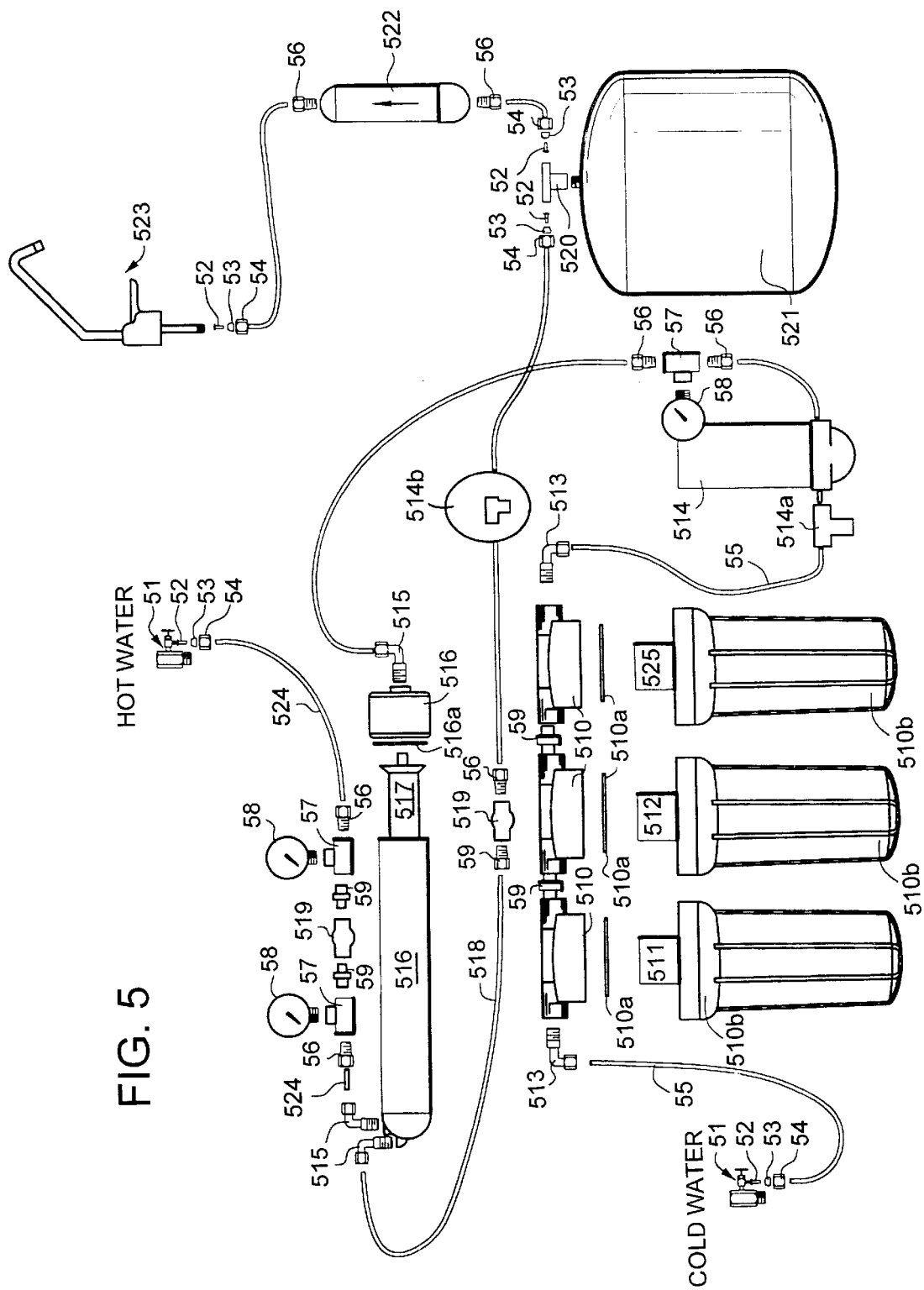
FIG. 5 is an iconic representation, and flow schematic, of a first preferred embodiment of a new-construction zero-waste reverse osmosis system packaged in accordance with the present invention.
Figure 6:
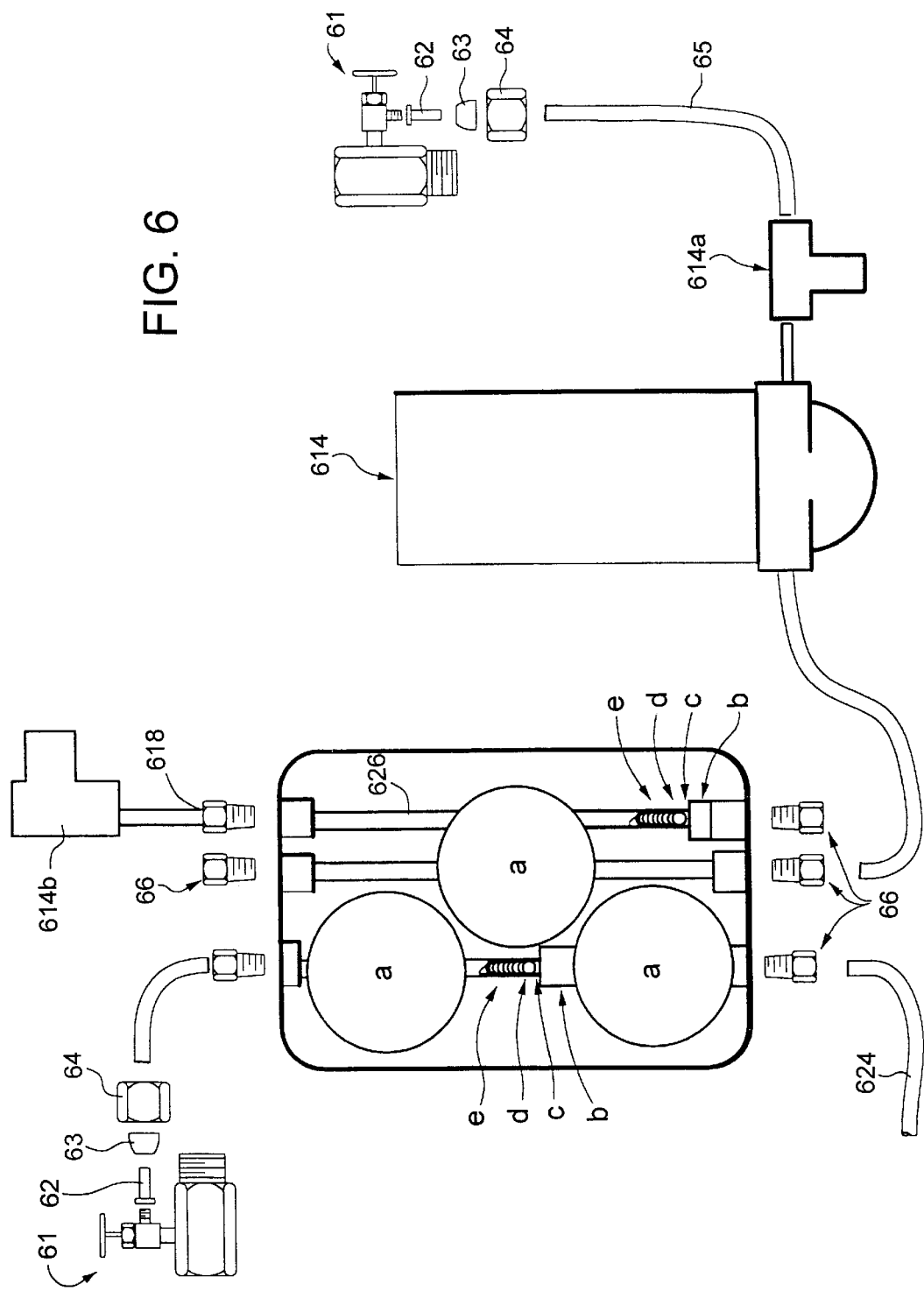
FIG. 6 is an iconic representation, and flow schematic, of a second preferred embodiment of a new-construction zero-waste reverse osmosis system packaged in accordance with the present invention.

An iconic representation of a first preferred embodiment of a new-construction zero-waste reverse osmosis system packaged in accordance with the present invention is shown in FIG. 5, and a like representation of a second embodiment is shown in FIG. 6.

The wetted parts list for the first preferred embodiment of the new-construction zero-waste reverse osmosis system shown in FIG. 5 is as follows:

| Item No. | Qty. | Description | NSF Material | Yes | No |
|---|---|---|---|---|---|
| 51 | 2 | *Easy Tap Adapter | Brass CDA 360 | x | |
| 52 | 5 | *¼" Brass Insert | Brass CDA 360 | x | |
| 53 | 5 | *¼" Delrun Sleeve | Delrun | x | |
| 54 | 5 | *¼" Brass Compression Nut | Brass CDA 360 | x | |
| 55 | 4' | *¼" Green Poly tubing | Polyethylene | x | |
| 56 | 5 | *Celcon Connection ¼" C × ¼" MPT | Celcon | x | |
| 57 | 3 | * Tee Brass ¼" FPT All Ends | | | x |
| 58 | 3 | * 0–100 ¼" Bottom Mount Pressure Gauge | | | x |
| 59 | 4 | ¼" MPT brass hex nipple | Brass CDA 360 | x | |
| 510 | 3 | 10" Filter Housing Lid | Polypropylene | x | |
| 510a | 3 | 10" Filter Housing O-ring | | x | |
| 510b | 3 | 10" Filter Housing Sump | Polypropylene | x | |
| 511 | 1 | 10" Spun Sediment filter cartridge | Polypropylene | x | |
| 512 | 1 | 10" 56 cubic inch GAC filter cartridge | | x | |
| 514 | 1 | * Booster Pump | | x | |
| 514a | 1 | * Electronic Solenoid valve | (ESO) | | x |
| 514b | 1 | * Electronic tank pressure switch | (TSO) | x | |
| 515 | 3 | Celcon Elbow ¼" C × ⅛" MPT | Celcon | x | |
| 516 | 1 | Membrane Vessel housing | Polypropylene | x | |
| 516a | 1 | Membrane Vessel housing O-ring | | x | |
| 517 | 1 | TFM membrane | | x | |
| 518 | 6' | *¼" Blue Poly Tubing | Polyethylene | x | |
| 519 | 2 | *¼" FPT Check Valve | | | x |
| 520 | 1 | ¼" Brass tank tee | Brass CDA 360 | x | |
| 521 | 1 | 3 Gallon Storage Tank | | x | |
| 522 | 1 | (Larger /Size) 10" line GAC final polishing filter | | x | |
| 523 | 1 | Faucet | | x | |
| 524 | 4' | *¼" Black Poly tubing | Polyethylene | x | |
| 525 | 1 | 10" 10-micron Carbon Block filter cartridge | | x | | where

| | |
|---|---|
| * | Components that are integrated into single assembly, or module |
| Underline | Components that are decreased in volume from a normal, non-integrated, RO System |
| Italic | Components that are increased in volume, or added, relative to a normal, non-integrated, RO System |

The wetted parts list for the second preferred embodiment of a new-construction zero-waste reverse osmosis system of FIG. 6 is as follows:

| Item No. | Qty. | Description | Material | NSF Yes | No |
|---|---|---|---|---|---|
| 61 | 2 | *Easy Tap Adapter | Brass CDA 360 | x | |
| 62 | 2 | *¼" Brass Insert | Brass CDA 360 | x | |
| 63 | 2 | *¼" Delrin Sleeve | Delrun | x | |
| 64 | 2 | *¼" Brass Compression Nut | Brass CDA 360 | x | |
| 65 | 3' | *¼" Green Poly tubing | Polyethylene | x | |
| 66 | 6 | *Celcon Connection ¼" C × ¼" MPT | Celcon | x | |
| 614 | 1 | *Booster Pump | | x | |
| 614a | 1 | *Electronic Solenoid valve | (ESO) | | x |
| 614b | 1 | *Electronic tank pressure switch | (TSO) | x | |
| 618 | 2' | *¼" Blue Poly Tubing | Polyethylene | x | |
| 624 | 3' | *¼" Black Poly tubing | Polyethylene | x | |
| 626 | 1 | *Zero Waste Module housing | Polypropylene | | x |
| | 3 | *a) ⅛" FPT Center mount 0–100 pressure gauge | | | x |
| | 2 | *b) Internal plug or disk | Polypropylene | | x |
| | 2 | *c) Vitron o-ring | Vitron | | x |
| | 2 | *d) Vitron or Teflon ball | | | x |
| | 2 | *e) 316 Stainless Steel spring | | | x | where

| | |
|---|---|
| * | Components that are integrated into single assembly, or module |
| Underline | Components that are decreased in volume from a normal, non-integrated, RO System |
| Italic | Components that are increased in volume, or added, relative to a normal, non-integrated, RO System |

Note in the parts lists for both FIGS. 5 and 6 the large numbers of components, indicated by an asterisk, that are integrated into a single, major, assembly. Note that the underlined components are generally decreased in volume from counterpart components present within a counterpart previous non-integrated (zero-waste) RO system. These underlined components generally outnumber, and represent a greater cumulative volume, than those components that are listed in boldface, meaning that the are enlarged, or added, from the counterpart previous non-integrated (zero-waste) RO system. The preferred materials for all components are given.

Figure 7:
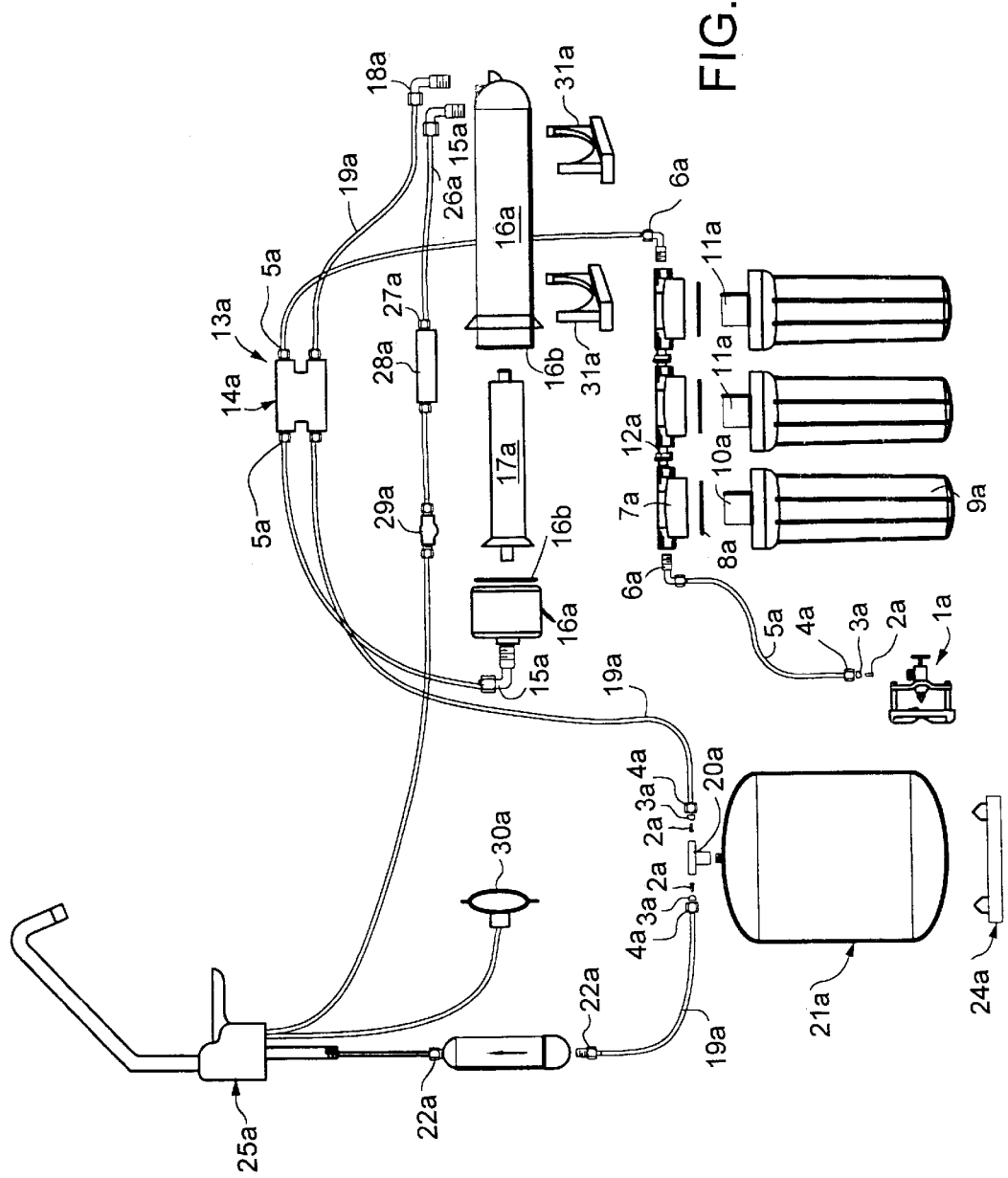
FIG. 7 is an iconic representation, and flow schematic, of the adaptation of the principles of the present invention to a reverse osmosis system that is not zero-waste.

The packaging principles of the present invention may be adapted for reverse osmosis system, otherwise of conventional design, that is not zero-waste. Such a system is illustrated in FIG. 7. The wetted parts list for this non-zero-waste reverse osmosis system is as follows:

| Item # | Description |
|---|---|
| 1a | Valveselfpiercing |
| 2a | *Insert brass ¼" |
| 3a | *Sleeve-Delrin ¼" |
| 4a | *Nut-brass ¼" compression |
| 5a | *Tubing green ¼" |
| 6a | Elbow-Plastic ¼" C × ¼" MPT |
| 7a | Lid ¼" FPT |
| 8a | O-ring filter housing |
| 9a | Housing-filter 10" |

-continued

| Item # | Description |
|---|---|
| 10a | Sediment-10"-spun (5M-10) |
| 11a | Carbon-10" - 56 cu.in. (GAC-10-56) |
| 12a | Hex-Nipple-Brass ¼" MPT |
| 13a | Nut-plasticblack¼"compression |
| 14a | Valve-Shutoff |
| 15a | Elbow-Plastic ¼" C × ⅛" MPT |
| 16a | Membranes Vessel Housing |
| 16ab | o-ring membrane housing |
| 17a | MEM-TFM-18 |
| 18a | ElbowCheckValve¼"C×¼"MPT |
| 19a | *Tubing Blue ¼" |
| 20a | Tank Tee brass |
| 21a | 3 gallon Storage tank blue |
| 22a | *Connector plastic ¼" c × ¼" MPT |
| 23a | Inline-6"finalPolishingfilter(1M6) |
| 24a | Tank Stand |
| 25a | FaucetAir-gapChrome |
| 26a | Tubing black ¼" |
| 27a | NutwhitePlasticcompression |
| 28a | Flowrestrictor |
| 29a | Union-plastic¼"C×¼"C |
| 30a | Drainsaddle⅜"C |
| 31a | Vessel mounting Clips | where

| | |
|---|---|
| * | Components that are integrated into single assembly, or module |
| Underline | Components that are decreased in volume from a normal, non-integrated, RO System |

| | |
|---|---|
| Italic | Components that are increased in volume, or added, relative to a normal, non-integrated, RO System |

As before, the packaging principles of the present invention make for a more compact system with a higher degree of integration than heretofore.

Figure 8:
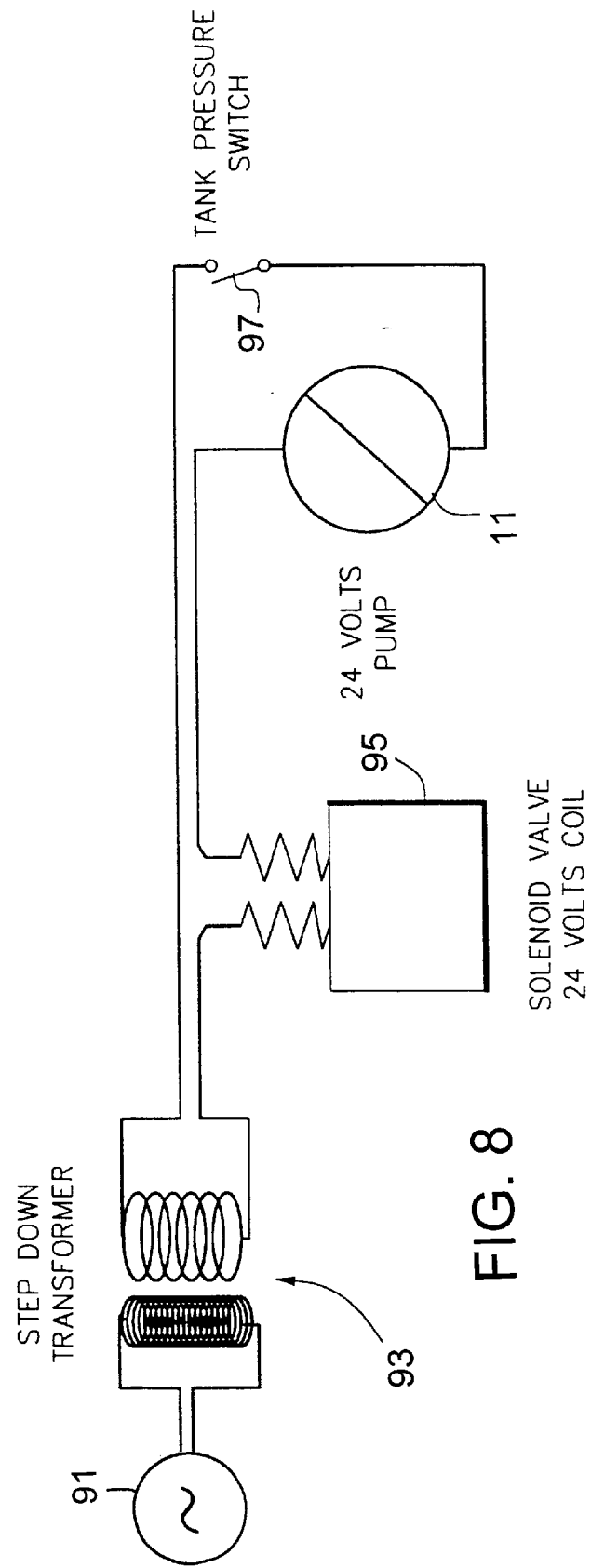
FIG. 8 is an electrical schematic diagram of the preferred retrofit zero-waste reverse osmosis system of the present invention, previously seen in FIGS. 1–2.

An electrical schematic of either preferred embodiment of a zero-waste reverse osmosis system in accordance with the present invention is shown in FIG. 8.

Although specific embodiments of the invention have been described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

In accordance with the preceding explanation, variations and adaptations of a zero-waste reverse osmosis unit, and its functional partitionment and packaging, in accordance with the present invention will suggest themselves to a practitioner of the mechanical and fluid flow design arts. For example, adding one or more components to an assembly or assemblies, or substituting various types of valves and gauges for the those types implied in the drawings, or listed in the list of preferred parts, does not erode the essential essence of the present invention, as expressed within the following claims, as a new and useful basis of organizing, partitioning and packaging a zero-waste RO system both so that such a system may be realize retrofit of an existing non-zero-waste RO system, and may be newly constructed at a beneficially higher degree of integration than heretofore.

In accordance with these and other possible variations and adaptations of the present invention, the scope of the invention should be determined in accordance with the following claims, only, and not solely in accordance with that embodiment within which the invention has been taught.

What is claimed is:

1. A method of retrofitting a pre-existing reverse osmosis system having at least
    a reverse osmosis membrane vessel, and
    a purified water storage tank,
    where water from a source of water is converted into purified water at a first outlet port, and into waste water at a second outlet port, of the reverse osmosis membrane vessel, the retrofitting method comprising:
        first-disconnecting a flow of water from the source of water from any flow-connection to an inlet port of the reverse osmosis membrane vessel; and
        first-inserting in-line the disconnected flow of water an integrally-packaged first sub-assembly, having a first sub-assembly input port flow-connected to a pump flow-connected to a solenoid valve flow-connected to a pressure gauge flow-connected to a first sub-assembly output port, so that the first sub-assembly input port becomes flow-connected to the source of water, and so that the first sub-assembly output port becomes flow-connected to the inlet port of the reverse osmosis membrane vessel.

2. The method of retrofitting a pre-existing reverse osmosis system according to claim 1 further comprising:
    second-disconnecting a flow of purified water from the first outlet port of the reverse osmosis membrane vessel from any flow-connection to the purified water storage tank; and
    second-inserting in-line the disconnected flow of purified water an integrally-packaged second sub-assembly, having a second sub-assembly input port flow-connected to a check valve flow-connected to a tank shut-off valve flow-connected to a second sub-assembly output port, so that the second sub-assembly input port becomes flow-connected to the first outlet port of the reverse osmosis membrane vessel and so that the second sub-assembly output port becomes flow-connected to the purified water storage tank.

3. The method of retrofitting a pre-existing reverse osmosis system according to claim 2 further comprising:
    third-disconnecting a flow of waste water from the second outlet port of the reverse osmosis membrane vessel; and
    third-inserting in-line the disconnected flow of waste water an integrally-packaged third sub-assembly, having a third sub-assembly input port flow-connected to a pressure gauge flow-connected to a dual check valve flow-connected to a pressure gauge flow-connected to a third sub-assembly output port, so that the third sub-assembly input port becomes flow-connected to the second outlet port of the reverse osmosis membrane vessel and so that the third sub-assembly output port becomes flow-connected to the source of water.

4. The method of retrofitting a pre-existing reverse osmosis system according to claim 3 further comprising between the third-disconnecting and the third-inserting steps:
    removing a flow obstruction present in the flow of waste water from the second outlet port of the reverse osmosis membrane vessel.

5. The method of retrofitting a pre-existing reverse osmosis system according to claim 4 further comprising after the removing step:
    transmitting the removed flow obstruction remotely from a site of the retrofitting as physical proof of conducting the retrofitting.

6. The method of retrofitting a pre-existing reverse osmosis system according to claim 3
    wherein the first-inserting, the second-inserting and the third-inserting steps are done at the same time because the integrally-packaged first sub-assembly, the integrally-packaged second sub-assembly, and the integrally-package third sub-assembly are all (i) flow-connected and (ii) physically mounted together as one assembly.

* * * * *